(12) United States Patent
George (10) Patent No.: US 8,856,151 B2
(45) Date of Patent: Oct. 7, 2014

(54) OUTPUT FIELD MAPPING OF USER DEFINED FUNCTIONS IN DATABASES

(75) Inventor: Muthian George, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 13/249,482

(22) Filed: Sep. 30, 2011

(65) Prior Publication Data

US 2012/0191732 A1 Jul. 26, 2012

Related U.S. Application Data

(63) Continuation-in-part of application No. PCT/US2011/022437, filed on Jan. 25, 2011.

(51) Int. Cl.
*G06F 17/30* (2006.01)

(52) U.S. Cl.
CPC .............................. *G06F 17/30592* (2013.01)
USPC .......................................... 707/755; 717/140

(58) Field of Classification Search
USPC ........................................................ 707/755
See application file for complete search history.

(56) References Cited

U.S. PATENT DOCUMENTS

| | | | |
|---|---|---|---|
| 5,742,806 A | 4/1998 | Reiner et al. | |
| 6,067,542 A * | 5/2000 | Carino, Jr. | 707/999.004 |
| 6,385,604 B1 | 5/2002 | Bakalash et al. | |
| 6,421,665 B1 | 7/2002 | Brye et al. | |
| 6,473,750 B1 | 10/2002 | Petculescu et al. | |
| 6,775,682 B1 | 8/2004 | Ballamkonda et al. | |
| 7,383,234 B2 | 6/2008 | Iyer et al. | |
| 7,836,066 B2 * | 11/2010 | Chang et al. | 707/760 |
| 7,840,545 B2 | 11/2010 | Hacigumus et al. | |
| 8,082,273 B2 | 12/2011 | Brown et al. | |
| 8,538,954 B2 | 9/2013 | George | |
| 2003/0037048 A1 | 2/2003 | Kabra et al. | |
| 2005/0177579 A1 | 8/2005 | Blakeley et al. | |
| 2006/0010159 A1 | 1/2006 | Mirchandani et al. | |
| 2006/0020620 A1 * | 1/2006 | Iyer et al. | 707/102 |
| 2006/0136415 A1 | 6/2006 | Ramsey et al. | |

(Continued)

FOREIGN PATENT DOCUMENTS

| | | |
|---|---|---|
| EP | 0 455 447 A3 | 4/1991 |
| EP | 0 459 683 A3 | 12/1991 |

OTHER PUBLICATIONS

Data-Continuous SOL Process Model, Oiming Chen and Meichun Hsu, HP Labs Palo Alto, California, USA Hewlett Packard Co, R. Meersman and Z. Tari (Eds.): OTM 2008, Part I, LNCS 5331, pp. 175-192,2008. © Springer-Verlag Berlin Heidelberg 2008.

(Continued)

*Primary Examiner* — Rehana Perveen
*Assistant Examiner* — Tiffany Thuy Bui (57) ABSTRACT

Systems and apparatuses are provided for analytical data processing. A system includes a processor and a non-transitory computer readable medium, comprising machine readable instructions executable by the processor. The instructions include a query compiler to identify a call to a user defined function and an output expression defining an output field for the user defined function within a query and generate an output table object for the user defined function. The generated output table object contains the defined output field. The instructions further include a processing engine to execute the user defined function and populate the output field in rows into the output table object with the output of the user defined function.

13 Claims, 2 Drawing Sheets

(56) References Cited

U.S. PATENT DOCUMENTS

| | | | |
|---|---|---|---|
| 2006/0218123 | A1 | 9/2006 | Chowdhuri et al. |
| 2009/0112799 | A1* | 4/2009 | Barsness et al. ............ 707/3 |
| 2009/0150907 | A1* | 6/2009 | Aharoni et al. ............ 719/318 |
| 2010/0023471 | A1* | 1/2010 | Baldwin et al. ............ 706/47 |
| 2010/0036801 | A1* | 2/2010 | Pirvali et al. ............ 707/2 |
| 2010/0241646 | A1 | 9/2010 | Friedman et al. |
| 2010/0250572 | A1 | 9/2010 | Chen et al. |
| 2011/0040773 | A1 | 2/2011 | Danesi et al. |
| 2011/0047172 | A1 | 2/2011 | Chen et al. |
| 2011/0161356 | A1 | 6/2011 | de Castro Alves et al. |
| 2012/0005190 | A1* | 1/2012 | Faerber et al. ............ 707/718 |
| 2012/0110001 | A1 | 5/2012 | Young |
| 2012/0130963 | A1* | 5/2012 | Luo et al. ............ 707/693 |
| 2013/0031139 | A1* | 1/2013 | Chen et al. ............ 707/802 |

OTHER PUBLICATIONS

Extend UDF Technology for Integrated Analytics, Oiming Chen, Meichun Hsu, and Rui Liu, HP Labs, Palo Alto, California, USA and HP Labs, Beijing China, T.B. Pedersen, M.K. Mohania, and AM. Tjoa (Eds.): DaWaK 2009, LNCS 5691, pp. 256-270, 2009. © Springer-Verlag Berlin Heidelberg 2009.

Pal, S. et al.; "Xml Best Practices for Microsoft SQL Server 2005"; Microsoft SQL Server; Apr. 2007; 23 pages.

PCT; "Notification of Transmittal of the International Search Report and the Written Opinion of the International Searching Authority, or the Declaration"; cited in PCT/US2011/022437; mailed Sep. 19, 2011; 9 pages.

Purich, Oracle CEP COL Language Reference, 11 g Release 1 (11.1.1 ), May 2009, pp. 10-1 to 1 0-6; http://docs.oracle.com/cd/E16764_01 /doc.1111 /e12048/funcusr.htm#CJAGIB DA.

* cited by examiner

OUTPUT FIELD MAPPING OF USER DEFINED FUNCTIONS IN DATABASES

RELATED APPLICATIONS

The present invention claims priority from and is a Continuation-in-Part of PCT/US11/22437 filed on 25 Jan. 2011, which is herein incorporated by reference.

TECHNICAL FIELD

This invention relates to analytic data processing in databases and other information processing systems, and more particularly, to the use of output field mapping in user defined functions.

BACKGROUND

Analytical data processing systems consume tables of data which are typically linked together by relationships in databases that simplify the storage of data and make queries of the data more efficient. A standardized query language, such as the Structured Query Language (SQL), can be used for creating and operating relational databases. Analytic data processing involving statistical and other numerical procedures is the application of computer technology to solve problems in business and industry. The science of analytics is concerned with extracting useful properties of data using computable functions, generally from large databases. Analytics therefore bridges the disciplines of computer science, statistics, and mathematics.

DETAILED DESCRIPTION

Many databases have the framework for processing a limited number of in-built analytic functions. Unfortunately, real-world analytical problems using data from databases go beyond the analytic functions natively supported in databases, and datasets in databases that require intensive analytical processing often end up using third party analytical packages for analytical processing. In situations where the datasets are large, they are often retained outside the databases due to the limited analytical capabilities available in databases. These packages require data to be retrieved from databases, persisted outside the database, and reformatted before processing. Since these approaches move data away from the secure database tables to a location associated with the analytical processes, the result is a replication of same large raw data sets in different formats in multiple locations, with the accompanying security and data governance risks for confidential data. Further, this approach results in excessive manpower cost, licensing costs for analytics processing, and hardware cost for data retrieval, management, and storage. The complexity in processing results in significant latency, making it impractical for real-time analytics.

User defined functions are varied in nature and can include general statistical and numerical computations that are commonly used across different applications as well as specialty analytics that apply to vertical markets. In order to integrate user defined functions into a database engine, the systems and methods described below standardize the syntax and usage of user defined functions in a query. This standardized syntax allows for the explicit mapping of output fields while executing the user defined function. Further, by explicitly mapping the output fields of the user defined functions, the systems and methods allow for the return of multiple output fields in a single call to the user defined function. Integrating user defined functions into a database engine in this manner significantly reduces the analytical application processing time, thus, allowing the results to reflect the truth of the data universe at the time of performing the analytics.

Figure 1:
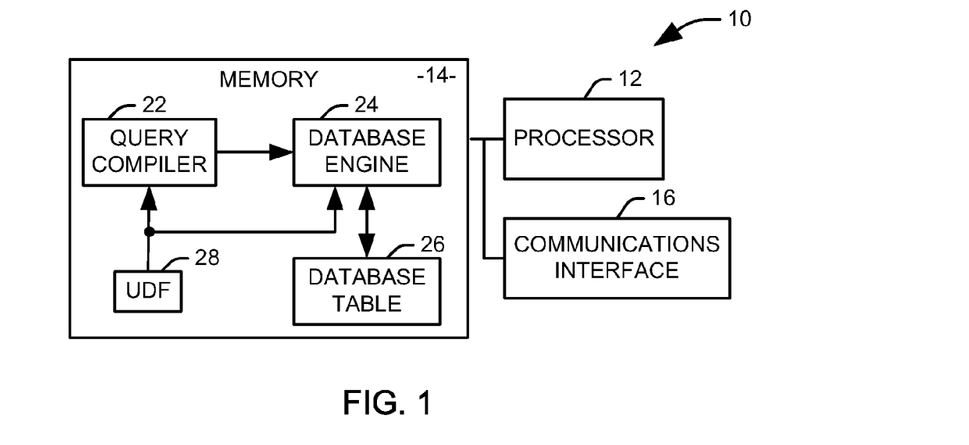
FIG. 1 illustrates an example of an analytic data processing system in which user defined functions (UDF) utilize explicit output mapping.

FIG. 1 illustrates an example of an analytical data processing system 10 in which user defined functions (UDF) use explicit output field mapping. For example, the system 10 of FIG. 1 can represent a database system, a data warehouse, a data mart, an in-memory database, a standalone OLAP engine, a business intelligence report generation system, a data mining system, or a federated query processing system. The system 10 includes a processor 12 and a memory 14 connected to a communications interface 16. It will be appreciated that the communication interface 16 can include any appropriate hardware and machine readable instructions for receiving database queries from an associated query source (not shown) and returning the results of the queries to the query client. Accordingly, the communications interface 16 can include any or all of a bus or similar data connection within a computer system or a wired or wireless network adapter. The memory 14 can include any appropriate standard storage devices suitable for use with computer systems, such as magnetic and optical storage media.

The device memory 14 can include a query compiler 22, a processing engine 24 to compile and execute queries on data tables 26, and a user defined function (UDF) 28. The query complier 22 can utilize any appropriate query language, for example, structured query language (SQL) or multidimensional expression (MDX) language. In one implementation, the user defined function 28 is stored as one of a shared object or a dynamic link library and dynamically loaded into the database system. The query compiler 22 identifies a call to the user defined function 28 with a list of input, output and parameter expressions associated with the function. The query compiler 22 retrieves the input, output and parameter metadata from the user defined function 28 and validates and resolves the lists of input, output and parameter field expressions in the call to the user defined function in the query. It will be appreciated that not every function will have an input, for example, table-valued user defined functions do not have input field arguments. When output fields are not specified in a call to the user defined function, default output fields defined in the metadata of the user defined function can be used for mapping the output table object. It will further be appreciated that the list of output field expressions in a call to the user defined function can represent a proper subset (i.e., less than all) of the output fields associated with the user defined function. In a call to the user defined function, the output fields can be mapped in any order irrespective of the order in which they are mapped in the output metadata of the user defined function. The database engine 24 starts the execution process to the user defined function by composing input and output table and parameter objects from the arguments in the user defined function call in the query and proceeds to execute the function using input rows set in the input table object. When result rows are produced from the user defined function in the output table object, they are retrieved by the database engine 24.

To facilitate the generation of the input and output table objects, the user defined function 28 exposes input, output and parameter metadata fields to the query compiler 22 and the processing engine 24. In the illustrated implementation, the output field metadata of the user defined function can include at least an output field name, a description of the output field, an associated data type for each field, and an indicator to indicate if the field is used as a default field for output. When a call to the user defined function does not explicitly map output field expressions, the default output fields marked in the output metadata of the user defined function are used for composing the output table object. The metadata can further include a defined class type, various parameters for customizing the function to a particular application and other processing instructions for the user defined function 28. In one instance, the exposed metadata can further include an application programming interface (API) comprising rules for validating and resolving input, output and parameter arguments within the call to the user defined function. It will be appreciated, however, that for the majority of user defined functions, a generalized API function pointer in the metadata will validate and resolve arguments unless the user defined function requires special handling for resolving input, output and parameter arguments. When a special validation and resolution function is needed for a user defined function, the developer builds one and makes it available for use in the metadata of the user defined function as a function pointer. The user defined function metadata also includes a second function pointer to construct a processing object instance for the user defined function.

Allowing for output mapping in user defined functions, in the manner described herein, provides a number of advantages. For example, explicitly mapping the output fields helps the compiler to organize all the output fields together into an output table object. Composing the output into an output table object is important to generalize processing of user defined functions, particularly the ones that return multiple rows of output with multiple fields. Similarly, the input field expressions are composed into an input table object and one or more input rows can be loaded into the input table object for processing the user defined function. Structuring input and output field expressions separately makes it easier to compose input and output table objects, simplifying the integration of user defined functions into the SQL compiler.

Further, explicit output mapping allows for multiple output fields to be returned from a function. By introducing a generalized output field mapping model into the query processing framework, the illustrated system 10 allows for the integration of a variety of analytical functions. Mapping a selected list of output fields from the total list of output fields from the user defined function also allows for selecting only the required output fields for client application into the projection list. So, the full complement of output fields for a given set of input fields can be implemented efficiently in a user defined function with the ability to pick and choose only the required output fields for client applications. This, generally speaking, avoids the need for implementing many function variants with the same input data fields only for the purpose of generating different sets of output fields. Therefore, user defined functions can be implemented efficiently with appropriate intermediate computations only to serve the output requested by the client application. This reduces computational cost.

Further, the ability to map the output fields in any order fits seamlessly into the projection order of fields in SQL queries. This also helps in nested UDF processing in queries where the output fields from the inner UDFs are composed in the order the input fields are required in the outer UDF. Modeling input, output and parameter fields as distinct syntactic elements for expressing all the class types of UDFs in queries makes queries readable, understandable and enables expressing complex analytical processing easier in queries. In general, these approaches elevate SQL queries to process complex analytical application processing with the help of analytical user defined functions.

Figure 2:
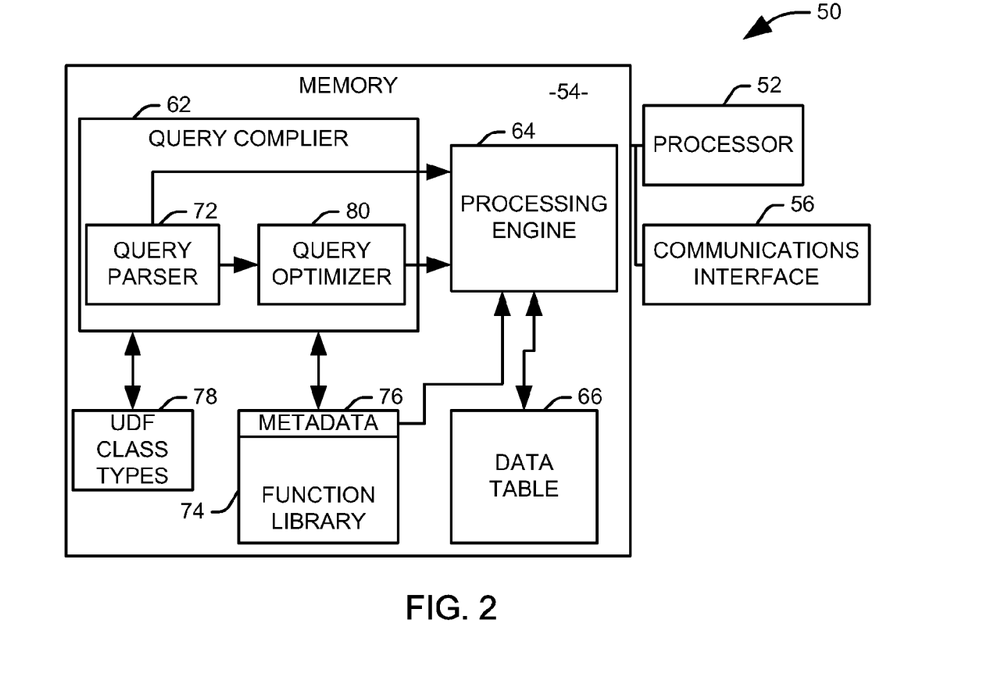
FIG. 2 illustrates one example of the integration of user defined functions (UDF) into a database system with explicit output mapping.

FIG. 2 illustrates one example of the integration of an analytical processing system into a database system 50, such that user defined functions (UDF) utilize explicit output mapping. The system 50 includes a processor 52 and a memory 54 connected to a communications interface 56. It will be appreciated that the communication interface 56 can comprise any appropriate hardware and machine readable instructions for receiving database queries from an associated query source (not shown) and returning the results of the queries to the query source. Accordingly, the communications interface 56 can include any or all of a bus or similar data connection within a computer system or a wired or wireless network adapter. The memory 54 can include any appropriate standard storage devices associated with computer systems, such as magnetic and optical storage media.

The device memory 54 can include a query complier 62 and a database query execution engine 64 to compile and execute queries on a database table 66. The query complier 62 includes a query parser 72 that identifies a call to a user defined function and any input, output, and parameter field expressions that may be available in the call to the user defined function. To this end, the query parser 72 processes a call to a user defined function in a database query using a standardized user defined function syntax to distinctly map input, output, and parameter field expressions to appropriate objects. For expressions in UDF inputs, the processing engine 64 evaluates the expressions and passes the evaluated values for the respective UDF input fields. For expressions in UDF output fields, the compiler 62 separates the expressions from the UDF output fields. The compiler 62 sets up a unique list of output fields for the UDF to process so that all the UDF output expressions can be computed from them. The processing engine 64 retrieves the values from the UDF output fields and evaluates the output expressions for each output row.

It will be appreciated that the basic syntax for all user defined functions, regardless of their associated class type, can be standardized, such that they are parsed in a similar manner at the query parser 72. In this syntax, input arguments consist of fields or expressions composed from fields from the SQL query table that can be composed into an input table object, output arguments consist of output fields or expressions composed using output field metadata from the user defined function that can be composed into an output table object, and parameter arguments are provided in the form of key/value pairs, where the key is the name of the parameter field metadata of the user defined function and the values for the field represented by the key can be composed into a parameter object. One example of the standardized syntax for expressing a user defined function in a query can include an expression such as:

<UDF name> ([<Input Expression List>]) [OUTPUT (<Output Expression List>)] [[WITH] PARAMETER (<key=valueExpression>[: . . . ])]

In the above user defined function expression, items within brackets are optional, items within parentheses are mandatory, and items given within chevrons (< >) are replaced with appropriate expressions. The names of the user defined functions are unique and case-insensitive when used in a call to the user defined function in a query. The user defined functions support variable input and output fields. A variable field is defined as a field that represents a minimum number of fields, usually zero or one, defined in the metadata and a maximum number of variant fields generated from a parameter provided in a call to the user defined function.

For most of the applications, variable fields supporting a minimum of either zero or one field defined in the metadata is sufficient. However, the minimum of number variants in the metadata other than zero or one is possible. When a variable field with minimum variable count is set to zero, a call to the user defined function can provide zero count for the field to eliminate the field for use in the user defined function. For example, in least-squares computations, when there is no continuous independent trait to fit in an equation, the number of continuous traits for the model is set to zero. However, if there are many continuous traits in the least-squares model, any number of such continuous traits can be used at the time of calling the least-squares user defined function to fit the model. Similarly, when a variable field is defined to have a minimum of one variant count, a call to the user defined function must provide at least one variant field for use in the user defined function. For example, in a least-squares user defined function, the minimum number of discrete factor traits can be set to one. This allows for computing at least one-way analysis of variance computation. However, there can be any number of discrete factor traits in least-squares equations at the time of calling the user defined function. This ensures that a least-squares computation cannot be called with zero discrete factor traits. A user defined function with either zero or one as the variable count in the metadata can provide any number of maximum count for the variable field.

The various expression lists can comprise a series of comma separated items. The input expression list, if present, can include columns or expressions composed using columns from query table. A mapping for the output fields of the user defined function is provided using the keyword OUTPUT, with the output expression list comprising of one or more output fields or expressions composed from output fields. Output fields are field names from the user defined function output metadata or field position identifiers using "$#" syntax, where $ represents a special character and # represents an ordinal number of the output field left to right starting from one. When the output is not explicitly mapped in a query, default output fields defined in the output metadata of the user defined function can be returned. When output fields are represented by '*' as in OUTPUT(*), all the output fields from the user defined function are returned. Parameters are given following keywords WITH PARAMETER and "key=valueExpression" separated by a colon character within parentheses when a user defined function requires parameters. In the key/value expression of a parameter, the "key" is the field name of the parameter field metadata in the user defined function. The "valueExpression" is a constant or an expression that evaluates to a constant while invoking the user defined function. Parameter expressions are evaluated to a constant value in the processing engine 64 before the parameter object is composed for the user defined function. The parameters defined in the expression can be dates, time, timestamps, integers, decimal values (double values), character strings, or comma separated array constants formed from one of these data types.

To allow for flexibility in later reference to the output fields within the query, each expression in the list of output expressions can be renamed with a user defined name using the following syntax:

<output field expression> [AS] <user defined alias output name>

In the above expression, items within chevrons (< >) are substituted with query specific expressions and the AS specification within the brackets is optional. This is similar to renaming the output expressions in query projection list into meaningful application specific alias names. The SQL compiler parses the above specification and renames the result of the expression with the user defined output alias field name. This is particularly important when the UDF output fields, ordinal numbers, or expressions composed using them need to be renamed into application specific meaningful alias names. When UDF output fields are defined in terms of ordinal numbers or when output field names collide with output field names from other user defined functions or query columns, renaming them with unique alias names across the query makes them usable in other places in the query.

In a query, the UDF output fields can be expressed as names from the UDF output field metadata or output field ordinal numbers. The ordinal number of an output field is expressed using the special character $ and a number following it staring from one. For example, $1 represents the first output field and $2 represents the second output field in the order output fields are defined in the output metadata. If there are ten output fields for a user defined function, $1 represents the first output field, $10 represents the last output field and the rest of the output fields fall in between in the incremental order of the number following $. Output ordinal numbers are given as a shortcut to representing output field names. The output field ordinal numbers are used only in the output expressions of UDFs. For each UDF, the ordinal number starts from $1 and, therefore, in a query there could be many $1 fields across many UDFs each of which is significant only within its own UDF output expression. Ordinal numbers cannot be used outside the UDF output expressions. If they need to be used outside the UDF expression, they have to be renamed by an alias name. Output field names mapped from user defined functions can be used by name in a query when the names are unique across a query. When output field names collide with field names in a query or output field names from other user defined functions, they have to be mapped to unique alias names for use in other parts of a query. Output fields can be selected in any order by using either the output field name or the ordinal number. It will be noted that the ordinal numbers for a query are fixed for an instance of a call to the user defined function and sequential and, therefore, irrespective of the position in the output mapping, the ordinal number will represent the same output field.

All or a subset of the output fields from the UDFs can be selected according to the application requirement in any desired order within the output expression in a call to the user defined function. Position independent output mapping is important for nested UDF queries where the inner UDF output fields are mapped to match the order of the input fields required for the outer UDF. Selection of only the required output fields allows the UDFs to implement all the possible output fields for a given set of input fields and leave the choice of output usage to the query user according to application requirement. This feature essentially avoids unnecessary implementations of the same UDF having the same input fields, but varying only in output fields for different application needs. Also, smart UDFs process only the requested output fields from the query to save computation cost. In many UDFs, a minimum set of intermediate computation values are required for generating a variety of output fields. For example, the statistical computations for a single measure data field such as average, standard deviation, variation, standard error and coefficient of variation require sum, sum of squares and count for computing all the values. Therefore, clubbing together the computations of common outputs from input arguments and selecting only the required output in the query saves computation cost and avoids the proliferation of a number of UDF implementations with the same basic intermediate computation cost.

Input and output fields are marked as fixed or variable types in the input and output metadata of each user defined function. It will be appreciated that a given user defined function requires a standard order and number of inputs, as defined in the input metadata for the function. Each input field in the metadata of a user defined function is referenced by a corresponding input argument field or fields in the query. Specifically, fixed fields in the metadata of a user defined function will have only one corresponding input argument field and variable input fields can have a minimum, generally of zero or one fields, and a maximum number of variants in consecutive order of input argument fields in a call to the user defined function in the query. Input and output fields can have fixed or undefined data types within the metadata. When the data type of an input field is undefined, the field obtains its data type from the data type of the corresponding input field argument in the query. The query input argument field defines if the field has a null value or not. Nullability is the property of a data field to indicate if the field must have value when it is being set to not nullable and need not have value or value being unknown when it is set to being nullable. Therefore, UDF implementations have to consider the possibility of null values in query input argument, perform appropriate processing and generate appropriate output field values. For fields having a fixed data type, data from the input query argument field is converted to the required input field data type of the user defined function at runtime when the data type does not match and the data type promotion is valid.

When the data type is undefined in an output field, it is set to depend upon a specific input field for resolution. An undefined fixed output field is set to depend upon a fixed input field. Setting an undefined output field to depend on a variable input field is an error. An undefined variable output field can be set to depend upon either a fixed or variable input field. When the undefined variable output field is set to depend upon a fixed input field, all the variants of the output field generated in a call to the user defined function obtain the data type from the fixed input argument field. When the undefined data type of an output variable field is set to depend upon a variable input field, the variants generated from the input and output fields must match in number in a call to the user defined function and the data type of the output generated fields are resolved from the corresponding input variant arguments. At the query complier 62, undefined output fields are resolved from the input fields using the rules described above. The metadata can also include default output fields, which are returned when a query does not explicitly map output fields.

When there is only a single input variable field for a user defined function, it is resolved at the query compiler from the input arguments in the query. Specifically, a repetition number for the variable field can be computationally determined as the difference between the total number of input field arguments and the number of fixed input fields defined in the user defined function metadata. When there are multiple input or output variable fields, integer value parameter fields can be used to provide the repetition number, with each variable field having a corresponding parameter field. When the query is processed, the value from the parameter field is used for validating and resolving the repetition number for the variable input and output fields. The names for the variable input and output fields can be generated serially by extending the base name of the variable field with a number incrementally starting from one. For example, if the base name of a variable field is 'foo' and the variant count is three, fields with variant field names 'foo1', 'foo2' and 'foo3' are generated. Output mapping can use these generated names for variable fields. The fixed data type of all the variable input and output fields is used for all the variant fields generated. The undefined data type of the variable input field is resolved by the data type of the corresponding input field arguments in the query. A general purpose function supplied with the system can be used to validate input and output fields and resolve their data types and lengths at the query compiler 62 when an explicit validation and resolution function is not supplied by the user defined function as a function pointer in the metadata.

If there are variable fields in the input and the output, their repetition count is determined using a standard set of logical rules. Note that, in general, for each variable field, the minimum repletion count is set to either zero or one. When there is one variable field that has a minimum repetition count set as zero, the total number of input argument fields to a call to the user defined function can be one less than the total number of input fields in the metadata indicating that the variable field is omitted from the input argument list of fields. If there is only one variable field in the input, the number of variants for the variable field is computed as the number of input field arguments in the UDF minus the number of fixed input fields in the metadata. If there are more than one input variant fields for a UDF, each variable field must be set to depend upon an integer parameter field. It will be appreciated that, even if there is only one variable field, a corresponding parameter field can be given. In the query, each such parameter field is given an integer value for resolving the respective dependent variable input or output field. One integer parameter field can be used in many variable input and output fields for variant count resolution when all the fields require the same repetition number. Output variable fields can be set to depend upon an input variable field for the generation of variants or an integer parameter field. At query compile time, based on either the resolution of input variable fields or the value from the supporting integer parameter field, the number of repetition variants in the variable output field is resolved.

Repetition variants from the variable fields are generated contiguously starting from the position of the field in the metadata. For example, if there are five output fields for a UDF with two variable fields at position two and four with repetition counts two and three respectively, the total output fields generated, along with their ordinal numbers in parentheses, would be:
 1. FieldA ($1)
 2. FieldB1 ($2), FieldB2 ($3)
 3. FieldC ($4)
 4. FieldD1 ($5), FieldD2 ($6), FieldD3 ($7)
 5. FieldE ($8)

It will be appreciated that for a user defined function call, the ordinal numbers are fixed at runtime and using the ordinal number all or a subset of output fields can be selected in the output field mapping. For the same user defined function in the same query or in another query, there can be calls with a different repetition count for the second and fourth variable fields. In such cases, the ordinal number for each call will reflect the repetition count given and will be different from the mapping shown above.

For the above UDF, the query can retrieve all the output fields with OUTPUT(*) mapping which results in the output of all the fields in the order given above. Given the above list of output fields for the query, the query can use either the field names or the ordinal numbers to select the required output fields. For UDFs with variable fields, the variable field names and the ordinal numbers of the fields vary according to the repetition count of each variable field at query compilation time. When UDF output fields are mapped with the ordinal number of output fields, the resolution and validation utility function resolves the ordinal numbers into appropriate output field names.

In one implementation, the user defined functions are built in a UDF library 74, for example, as shared objects or dynamic link libraries, and loaded into the database engine. As described previously, each user defined function exposes a self-describing UDF metadata 76 that can be retrieved by the query complier 62. The metadata object of a UDF is a self contained and describing object. It contains the function pointers for the UDF processing factory constructor, and the validation and resolution utility function. It has the arrays of input, output and parameter fields. The UDF metadata object has the UDF name, UDF description, class type, and an indicator to denote if the UDF requires all the input records together or one row at a time while processing.

The UDF metadata 76 can include output field names, descriptions of each output field, data type, an indicator to denote if the field is a variable field, variable field resolving parameter field name, size of field, null indicator, resolving input metadata field name and an indicator to denote if the output field is returned as a default field when the query does not map output fields. When a variable field is set, it is set with a minimum variant number of zero or one. Thus, a field can be represented with three constant values, minus one indicating that it is a fixed field, zero indicating that it is a variable field with minimum variant count of zero and one indicating that it is a variable field with a minimum count of one variant field. If a user defined function requires, the minimum variant count of a variable field in the metadata can be set to any number beyond one for which there is no restriction. There is no upper limit to the variant count which is application defined at the time of a call to the user defined function. If the field is a variable field, a resolving integer parameter field name can be set. If the parameter field is empty for an output variable field, an associated resolving input variable field name from the input field metadata can be used to provide the resolution. If there is only one input variable field, then the integer parameter name on which it depends can be omitted. Any such input field is resolved either by an integer parameter field or by computation when there is only one variable input field. Output variable fields must have to be set to depend upon a parameter or input variable field for resolution of variant count even if there is only one output variable field for a user defined function.

The data type of a field can be set to one of a valid data types or set to an undefined type. If the data type of the output field is set as undefined, the output field can inherit the data type associated with its resolving input field name and its corresponding input argument field. When the output field is undefined, the output field is set to depend upon an input metadata field, referred to as the resolving input metadata field. When the data type of the resolving input field metadata is undefined, the input metadata field gets first defined at the time of query compilation with the input argument field from the query table field which, in turn, resolves the dependent output field. In such a case, the size of the field and the null indicator are also inherited from the input argument field in the query.

Through the default output indicator in the output field, the metadata for each UDF designates a list of fields as default output fields. For example, these default fields can be selected by a UDF developer based on the general usage of the analytic function represented by the UDF. When UDFs in queries do not explicitly map output fields, the default fields are returned from the UDF in the order of their occurrence in the UDF output metadata. When queries map UDF output fields explicitly, the default output fields are ignored. Query applications can explicitly include the default fields in the output mapping of the UDF call without any restriction.

The query complier 62 accesses the metadata fields for query resolution and validation. The input and output fields can be either fixed or variable fields. Each fixed field represents only one field during execution of the query, while each variable field can represent a minimum of zero or one in the metadata, and a maximum number of fields defined in the call to the user defined function during execution. When input and output fields are marked as variable, they can be marked for a repetition count starting from a minimum of zero or one in the metadata. Each variable field can have any repetition count as the upper limit in a call to the user defined function. When a variable field is marked to start with a minimum number of zero count, a parameter field can supply a repetition count of zero just to let the user defined function to ignore the field completely. However, when a variable field is set with a minimum repetition count of one, there must be at least one input argument field for the field at the time of processing the query. If there is only one input variable field and it is marked to have a minimum repetition count of zero or one, it can be deduced without an integer parameter specification at the time of compilation and validated for the minimum count of repetition number. It will be appreciated that variable fields can occur at any input or output field position, and there can be multiple variable fields in input and output. The repetition count of a variable field for a given instance of the function can be provided, for example, as an integer parameter expression. Parameter fields that are used for resolving variable input and output fields are always of integer data type. Constant parameter expressions of scalar or array values of integer, double, date, time, time-stamp and character data types can also be defined for data processing requirements in the user defined function itself.

Function input fields of a user defined function are extracted from query fields, and composed as an input table object. Similarly, output fields can be determined from the list of mapped output fields or default output fields when output fields are not explicitly mapped for the user defined function and composed into an output table object. The query compiler 62 structures these input and output fields into self-describing table objects with field names, data types and data size to standardize processing of all user defined function class types. Table objects are capable of handling one record or multiple records simultaneously. Each table object has its own metadata to describe each field of the rows in the table object in terms of its field name, data type, data length, and indicator showing if the field is null. Table objects also have the ability to store and retrieve rows of data based on row number. They are capable of handling large row sets with the ability to manage memory overflow into disk files.

Each output field has a unique name within a UDF, specified in the UDF output field metadata. There is one UDF output field metadata object for each output field, such that for N output fields for a UDF, there are N output field metadata objects in an array. Similarly, there are arrays of input and parameter field metadata objects. Input, output and parameter metadata arrays are packaged together in a UDF metadata object along with additional information. The UDF metadata object is built by the UDF developer as an immutable static object and compiled along with the UDF processing code. The UDF processing code consists of an implementation of a UDF interface class, a factory constructor function to create an instance of the UDF processing object and, optionally, a utility function for validating and resolving the UDF call specification in a query at query compile time. In most of the cases, a general purpose utility function is sufficient for the validation and resolution of UDF specification in a query. UDF specific validation and resolution utility functions are built only for special validation and resolution requirements.

The listing of fields in the output expression allows the output of a user defined function to be mapped to a list of fields provided within the output metadata. When the number of output fields in the query is less than the number of output fields from the user defined function, the user defined function returns only the fields that are mapped in the query. Output fields can be mapped in any order in queries, using either the field name or field position identifier. When output fields, both fixed and variable, are mapped using position identifiers, the validation and resolution function substitutes output field position identifiers with output field names and sets data type and size in the output table object at query compile time.

Changing the order and mapping of output fields is particularly useful for nested user defined function processing, to allow an inner user defined function to return the fields in the order and number the outer user defined function requires its input argument fields. In the projection list, output field mappings from user defined functions are merged with the rest of the fields in the projection list in the order in which they are mapped. When multiple user defined functions occur in a query, projection fields are mapped similarly to queries with multiple OLAP functions.

The metadata 76 for each user defined function can also include an associated class type for each function out of a plurality of function class types 78 to assist in the optimization of the query. The user defined function class types implicitly set the rules for analytical data processing in the database engine along with the cardinality of their output results. For example, user defined functions belonging to some class types will be processed in OLAP windows, whereas such processing is inappropriate for other class types of functions. Unlike inbuilt functions that return only one output field, all the user defined function class types may return one or multiple output fields.

A query optimizer 80 establishes a plan for executing the received query, including calls to any user defined functions in the query. The query optimizer 80 retrieves metadata describing the associated class types of the user defined functions, and uses the associated class type of each user defined function to determine if the number of rows in the output of the function is known or determinate and if the output to the function is unknown or indeterminate. For class types having known outputs, the query optimizer 80 can proceed normally. Functions having indeterminate outputs are handled as part of an alternative optimization process, in which the potential impact of a function having a large number of output rows is mitigated. Each of the data objects extracted by the query parser 72 and the query plan developed at the query optimizer 80 are provided to the database engine 64 to execute the query, including the user defined function.

The database engine 64 uses the extracted query plan objects including the user defined function objects to execute the query plan to provide a query result, and returns the query result to the query source via the communications interface 56. During runtime, data are loaded into the input table object according to the requirements of the user defined function class type. With the input and output table objects as arguments, the data processing API of the user defined function is called to process data. The user defined function emits output into the output table object which is retrieved each time the processing function is called. In case there is no input, as in the case of table-valued user defined functions, the processing function is called with an empty input table object until all the output rows are retrieved.

One example of an analytic function that can be implemented in the database system using variable input and output fields is a multiple regression user defined function. It will be appreciated that in a multiple regression analysis, the number of independent variables varies according to the regression model fitted which is illustrated in the example below. Accordingly, a user defined function to perform this function will have variable output fields for beta coefficients and averages for independent variables, with the size of these variable fields being defined by a parameter value representing the number of independent variables in the desired model. The user defined function, for example, can be implemented as an aggregate class type of user defined function because it returns only one output row for N input rows processed.

An example query using a specific instantiation of the general multiple regression function is presented below. For example, the query could be used for studying how three independent expenses are affecting the dependent sales figures using sales and cost database tables, for example, data for ten years, with four quarters each, at each region and city in each country:

```
SELECT country,
    MultipleRegression(salesDollarValue, salespersonTrainingCost,
        advertizementCampaignCost, couponPromotionCost)
    OUTPUT(countObservations, alphaIntercept,
        beta1 AS betaSalespersonTrainingCost,
        beta2 AS betaAdvertizementCampaignCost,
        beta3 AS betaCouponPromotionCost,
        avgIndependent1 AS avgSalespersonTrainingCost,
        avgIndependent2 AS avgAdvertizementCampaignCost,
        avgIndependent3 AS avgCouponPromotionCost,
        avgDependent AS avgSalesDollarValue)
    WITH PARAMETER(COUNT_INDEPENDENT_VAR=3)
    FROM salesAndCost
    GROUP BY country;
```

In the above example, the first input field is the dependent field which is a fixed field. The second input field is the starting point for the independent fields, which is marked as a variable field with a minimum count of one, giving the user defined function two input field in the metadata. A first output field is the alpha intercept, 'alphaIntercept' and a second output is the average of the dependent variable, 'avgDependent,' each of which are fixed fields. A third output field, 'countObservations,' is a fixed field representing the number of observations. A fourth field, marked as a variable field, is named 'beta' and represents the beta coefficients produced by the regression analysis. A fifth field, also marked as a variable field, is named 'avgIndependent' and represents the average values of the independent variables.

Note that the fourth field can be repeated until all the beta co-efficient fields are mapped in a call to the user defined function. As described previously, the names of the fields are generated by appending an integer starting from one. Thus, in the following example, there are three beta co-efficient fields with field names beta1, beta2 and beta3 that are generated from the variable field base name 'beta'. The fifth field, avgIndependent starts only after all the beta fields are mapped and repeats similarly with a number appended to it starting from one. Using the output field names or the ordinal number, output fields can be mapped in any order in a query.

The user defined function requires one integer parameter field namely COUNT_INDEPENDENT_VAR. The validation and resolution function looks for the parameter keyword or field name in the parameter object to decide which multiple regression model to fit. In case the parameter field is not given in the parameter object specification, since there is only one input variable field for the user defined function, the validation and resolution API function computes the correct repetition number from the total number of input argument fields. There are two variable output fields and they require resolution and validation. The output variable fields are resolved in the absence of the integer parameter field only when the output variable fields are set to depend upon the single input variable field. In the multiple regression user defined function, 'beta' and avgIndependent variable fields are set to depend upon the second input field namely the independent field. In this example given, the model specifies three independent variables and, therefore, three output fields each for 'beta' and 'avgIndependent' are generated. Note that, in the metadata, the variable output fields, beta and avgIndependent, are marked for dependency resolution from the second input variable field. If the query does not map the 'avgIndependent' output field from independent-variables or any other field, the user defined function understands it from the fields requested by the user query in the output table object and does not project results for them.

The illustrated database system makes it possible to model complex analytic applications, including statistical applications, in SQL queries. Since the user defined function developer knows the class type, input, output and parameter of a user defined function, the UDF metadata is built as part of the user defined function for dynamic detection and validation of syntax and semantics of its usage at query compile time. There could be additional metadata captured in the database for managing user defined functions, such as user defined function usage and installation privileges that are independent of the metadata for the user defined function. The use of the parameter field allows for user defined functions general enough to allow processing of many analytical application models by varying only parameters in queries. Statistical applications such as multiple regression, least-squares, multivariate analytics and frequency distribution can be implemented with different statistical models depending upon the requirements of a given analysis simply by changing the integer parameter field value in the query. Accordingly, parameterization makes it easier to represent complex analytical models in simple key/value pair of parameters.

The system 50 further provides the ability to map only the required output fields in any order from user defined functions makes it easier to have nested user defined function queries where inner user defined functions return outputs required for the input of outer user defined functions. This helps in building complex applications in parts and composed by nesting in queries according to application requirement. The tight integration of user defined functions into SQL brings analytic application processing closer to the data, resulting in data security and less mobility of data across systems. It also makes it more efficient to build user defined functions in a programming language, such as C++, efficiently for serving vertical applications through SQL. With table-valued user defined functions available for use in the FROM clause of queries for collecting data from external sources in conjunction with the analytic user defined functions, users will find many analytic applications easier to model and process using data from internal and external sources in a SQL database.

Figure 3:
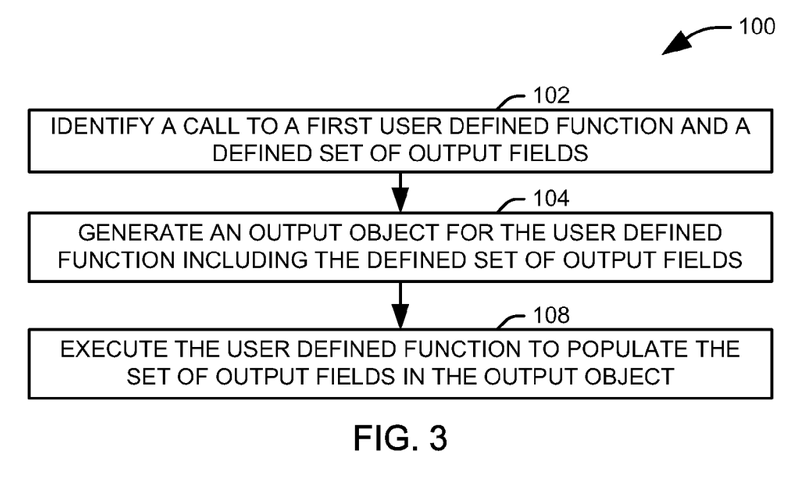
FIG. 3 illustrates one method for executing a query with a user defined function.

FIG. 3 illustrates one method 100 for executing a query. At 102, a call to a user defined function is identified in a structured query language (SQL) query by a query compiler, along with a defined set of output fields. It will be appreciated that the set of output fields mapped in a call to the user defined function can be a proper subset of the available output fields for the function, and that the fields can be provided in any desired order. At 104, an output is generated for the user defined function that includes the defined set of output fields. It will be appreciated that the output table object can contain multiple output fields representing output fields defined for the user defined function, where the defined output field can be fixed and variable output fields. At 106, the user defined function is executed in a database engine to populate the defined set of output fields in the output table object. The output table object can then be returned to the query processor to make the output fields available for further use within the query.

Figure 4:
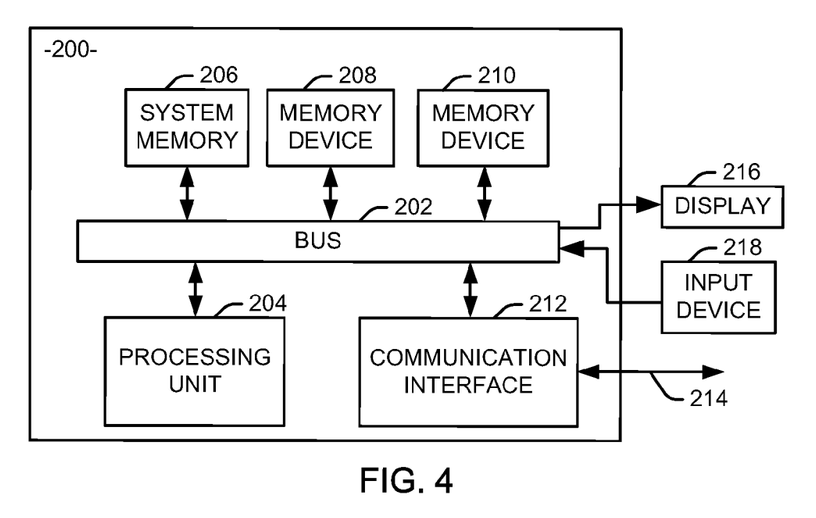
FIG. 4 is a schematic block diagram illustrating an exemplary system of hardware components capable of implementing examples of the systems and methods for user defined function integration disclosed in FIGS. 1-3.

FIG. 4 is a schematic block diagram illustrating an exemplary system 200 of hardware components capable of implementing the example systems and methods for user defined function integration disclosed in FIGS. 1-3. The system 200 can include various systems and subsystems. The system 200 can be a personal computer, a laptop computer, a workstation, a computer system, an appliance, an application-specific integrated circuit (ASIC), a server, a server blade center, a server farm, or any other appropriate processing component.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 operably interconnects the processing unit 204, the memory devices 206-210, the communication interface 212, the display 216, and the input device 218. In some examples, the system bus 202 also operably interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio.

Additionally, the memory devices 208 and 210 can serve as databases or data storage. Additionally or alternatively, the system 200 can access an external data source or query source through the communication interface 212, which can communicate with the system bus 202 and the communication link 214.

In operation, the system 200 can be used to implement a database system that executes user defined functions within or outside of an online analytics processing (OLAP) framework in response to an appropriate query. The queries can be formatted in accordance with various query database protocols, including SQL. Computer executable logic for implementing user defined functions in accordance with certain examples such as the real-time analytics system resides on one or more of the system memory 206, and the memory devices 208, 210. The processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present invention. It is, of course, not possible to describe every conceivable combination of components or methodologies for the purpose of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. An analytical data processing system comprising:
   at least one processor;
   a non-transitory computer readable medium, comprising machine readable instructions that when executed cause the at least one processor to:
      identify, by a query compiler, a call to a user defined function, the call being in a query and including at least one output expression defining output fields for the user defined function, the user defined function having metadata exposed to the query compiler and to a processing engine that executes the user defined function, the metadata indicating properties of the defined output fields, and the metadata comprising a function pointer for a validation and resolution of the defined output fields in the call to the user defined function;
      generate, by the query compiler, an output table object for the user defined function, the generated output table object containing the defined output fields; and
      execute the user defined function to populate the defined output fields in a row of data in the output table object.

2. The analytical data processing system of claim 1, the user defined function having a plurality of associated output field metadata in a sequence, the at least one output field expression being composed by one of output field names from fixed output fields, generated field names from variable output fields, and ordinal numbers derived from the output field metadata sequence.

3. The analytical data processing system of claim 1, the metadata indicating a field name, an associated data type, and a data size of a given defined output field from the defined output fields.

4. The analytical data processing system of claim 3, the metadata indicating that the associated data type of the given defined output field is undefined, the associated data type being set to depend on an input field such that the instructions upon execution derives a data type of the given defined output field from the input field on which the given defined output field is set to depend in the call to the user defined function.

5. The analytical data processing system of claim 1, the metadata defining a plurality of output fields associated with the user defined function in a first order, and the at least one output expression in the call to the user defined function defining a set of output fields from the plurality of output fields in a second order, the second order being different from the first order.

6. The analytical data processing system of claim 1, the at least one output expression in the call to the user defined function defining a set of output fields, the defined set of output fields being a proper subset of a plurality of output fields associated with the user defined function.

7. The analytical data processing system of claim 1, the at least one output expression comprising a user defined alias name for a given defined output field, such that the output table object has the user defined alias name for use in other parts of the query.

8. The analytical data processing system of claim 1, wherein the user defined function is executed when executing the query.

9. An analytical data processing system comprising:
   at least one processor;
   a non-transitory computer readable medium, comprising machine readable instructions that when executed cause the at least one processor to:
      identify, by a query compiler, a call to a user defined function, the call being in a query and including at least one output expression defining output fields for the user defined function, the user defined function having metadata exposed to the query compiler and to a processing engine that executes the user defined function, the metadata indicating properties of the defined output fields, and the metadata indicating a plurality of default output fields associated with the user defined function;
      generate, by the query compiler, an output table object for the user defined function, the generated output table object containing the defined output fields;
      execute the user defined function to populate the defined output fields in a row of data in the output table object; and
      return the default output fields when a call of the user defined function is without any output expression defining output fields for the user defined function.

10. An analytical data processing system comprising:
    at least one processor;
    a non-transitory computer readable medium, comprising machine readable instructions that when executed cause the at least one processor to:
       identify, by a query compiler, a call to a user defined function, the call being in a query and including at least one output expression defining output fields for the user defined function, the user defined function having metadata exposed to the query compiler and to a processing engine that executes the user defined function, the metadata indicating properties of the defined output fields, the metadata of the user defined function comprising output metadata fields indicating whether each defined output field is a fixed field, representing a single field in the output table object, or a variable field, representing zero, one, or multiple fields, wherein a minimum number of fields represented by the variable field is defined in the metadata;
       generate, by the query compiler, an output table object for the user defined function, the generated output table object containing the defined output fields; and execute the user defined function to populate the defined output fields in a row of data in the output table object.

11. The analytical data processing system of claim 10, wherein for a given defined output field that is a variable field, the instructions when executed causing the at least one processor to:

derive an integer value from one of an integer parameter field and a variable input field on which the given defined output field is set to depend, and generate a number of variant fields represented by the given defined output field in the output table object equal to the integer value.

12. A non-transitory computer readable medium, comprising machine readable instructions that when executed cause a system including a processor to:

identify a call to a user defined function having exposed metadata that defines a plurality of output fields having a first order;

generate at least one output expression providing a set of output fields from the plurality of output fields, the at least one expression included in a query, and the at least one output expression providing the output fields of the set in a second order different from the first order, the user defined function representing an inner user defined function of a nested processing arrangement, the second order representing an order in which the set of output fields is input into an output user defined function of the nested processing arrangement;

generate an output table object for the user defined function, the generated output table object containing the set of output fields; and execute the user defined function to populate the set of output fields in a row of the output table object provided as an output of the user defined function.

13. A method comprising:

identifying, by a query compiler executing in a system including a processor, a call to a user defined function, the call including at least one output expression defining a set of output fields that is a subset of a plurality of output fields defined by metadata of the user defined function, the call being within a query, wherein the metadata specifies a first order of the plurality of output fields, and wherein the at least one output expression specifies a second order of the output fields in the set of output fields different from the first order;

generating, by the query compiler, an output table object for the user defined function, the generated output table object containing the defined set of output fields;

executing the user defined function to populate the set of output fields in the output table object with an output of the user defined function; and outputting the plurality of output fields defined by the metadata in response to a call to the user defined function not including any output expression defining a set of output fields.

* * * * *